United States Patent [19]

Joelson

[11] Patent Number: 4,686,756
[45] Date of Patent: Aug. 18, 1987

[54] METHOD OF PRODUCING A SELF ALIGNING PIPE WITH CONFIGURED JOINT

[76] Inventor: C. R. Joelson, 2501 Bayshore Rd., Nokomis, Fla. 33555

[21] Appl. No.: 817,417

[22] Filed: Jan. 9, 1986

Related U.S. Application Data

[62] Division of Ser. No. 603,343, Apr. 24, 1984, Pat. No. 4,565,381.

[51] Int. Cl.⁴ ............................................. B21D 39/02
[52] U.S. Cl. ....................................... 29/463; 29/525
[58] Field of Search ......................... 29/463, 428, 525; 277/207 R, 207 A, 208–211, DIG. 2; 285/110, 230, 231, 345, 379

[56] References Cited

U.S. PATENT DOCUMENTS

| 2,882,073 | 4/1959 | James | 285/110 X |
| 2,999,699 | 9/1961 | Lafferty | 285/230 X |
| 3,046,028 | 7/1962 | Nathan | 227/208 |
| 3,048,415 | 8/1962 | Shook | 277/208 X |

FOREIGN PATENT DOCUMENTS

| 1129344 | 5/1962 | Fed. Rep. of Germany | 277/207 A |
| 1335842 | 7/1963 | France | 277/207 A |

*Primary Examiner*—Timothy V. Eley
*Attorney, Agent, or Firm*—A. W. Fisher, III

[57] ABSTRACT

A method of producing a self aligning concrete pipe with configured joint to improve the seal of the joint cooperatively formed between adjacent concrete pipes wherein each concrete pipe includes a male and female joint member formed on opposite ends thereof to operatively engage the corresponding joint member formed on the next adjacent concrete pipe to form the joint therebetween, the male joint member including a tongue element of predetermined peripheral configuration extending outwardly from the concrete pipe having a resilient seal attached thereto offset inwardly from the outer end thereof, the female joint member including a groove element extending inwardly from the oppostie end of the concrete pipe comprising an initial alignment stage, intermediate alignment stage and final seat recess stage, the initial alignment stage including an axial alignment camming surface of decreasing diameter having a linear dimension equal to or less than the inward offset of the resilient seal from the outer end of the tongue element and a horizontal and vertical alignment step having an inwardly inclined surface, the intermediate alignment stage including an axial alignment camming surface of decreasing diameter and a horizontal and vertical alignment step having an inwardly inclined surface and the final stage including a camming surface of decreasing diameter such that as adjacent concrete pipes are assembled the tongue element engages the initial and intermediate alignment stages to horizontally, vertically and axially align the adjacent concrete pipes permitting the tongue element to enter the final seat recess stage to form the joint therebetween.

9 Claims, 11 Drawing Figures

METHOD OF PRODUCING A SELF ALIGNING PIPE WITH CONFIGURED JOINT

CROSS-REFERENCE

This is a divisional application for co-pending application Ser. No. 603,343, filed Apr. 24, 1984, now U.S. Pat. No. 4,565,381.

BACKGROUND OF THE INVENTION

1. Field of the Invention

A method of producing a self aligning concrete pipe to improve the seal of the joint cooperatively formed between adjacent concrete pipes.

2. Description of the Prior Art

Concrete pipe of various sizes, shapes and lengths are widely used to transport or carry large volumes of water or other fluids. A primary problem has always been to secure dependable joints that prevent exfiltration and/or infiltration of fluids and sand or dirt particles.

An equally significant problem is the manufacture and assembly of concrete pipes and particularly oval concrete pipes axial, vertical and horizontal misalignment of adjacent concrete pipes during assembly.

The most simple, common and predominant joint is known as a T&G joint, consisting of a male member called a tongue and a female member called a groove, along with various resilient retaining or sealing rings/gaskets. Henceforth, in the following illustrations and descriptions of prior art and my invention, the three elements involved will for the sake of brevity and clarity be referred to as "tongue", "groove", and "gasket".

A different configuration of the groove in which the groove end is enlarged on the outside for additional strength, will be referred to as a "bell".

T&G joints are generally of two types. In the first type the walls of the tongues and grooves are slightly contoured for receiving different compatible configurations of gaskets.

The second type is similar with one exception, in that there is a recess in the wall of the tongue for receiving and containing an annular O ring which is about 15% smaller in diameter than the recess, and has to be stretched and shaped into place in the groove.

The first type of T&G joint has generally been superseded by the second type, because of the difficulty in manipulating, aligning and joining the T&G of the adjacent pipes, in a trench under adverse conditions, without mutilating or displacing the gasket.

The second type of T&G Joint, with a recess, has a lip forward of the recess that generally protects O ring or similar snap-in-gasket, against mutilation or displacement during joining.

This lip makes it possible to partially join the tongue and groove with concrete to concrete contact before the outer edge to the groove makes contact with the O ring or similar gasket in the recess of the tongue.

Extreme care (not always used) and extra time and labor is required to make sure that the O ring is uniformly stretched after being shaped in place on the recess of the tongue so as to maintain a uniform diameter, the lack of which could lead to snagging or insufficient pressure on one radial section of the groove resulting in a leaky joint.

However, since the diameter of the O ring is approximately twice the diameter of the depth of the recess, such O rings are still subject to being snagged or sheared or displaced by the leading edge of the groove if said leading edge fails to slip over the O ring in the recess during joining.

As a result of the extreme pressure required to seal a narrow radial section of the groove, it is necessary to enlarge the groove end, forming a bell to obtain the necessary strength to keep the groove from breaking out. The tongue is under compression and the groove is under tension and concrete has high compressive strength but rather low tensile strength.

The bell itself is costly and undersirable because:

the bell on the pipe requires a more expensive and complicated form, the bell also requires larger and heavier and more expensive pallets, the bell requires additional concrete;

the protruding bell makes loading and hauling to job site more difficult;

where the terrain is very low and the pipe has to be installed close to ground level, a deeper trench is required; and after the bed in the bottom of the trench has been contoured to the specified slope, the bed then requires additional excavating to accommodate the protruding bell.

All of these add to the costs by requiring more expensive equipment with additional time and labor.

Prior art is shown in U.S. Pat. Nos. 2,809,853; 2,832,614; 3,315,971; 3,414,273; 3,515,396; 3,520,541; 3,573,871; 3,575,430; 3,656,771; 3,675,685; 3,857,589; 4,084,828; 4,174,859; 4,279,425; together with Germany No. 2,402,022 and Great Britain No. 1,080,816

SUMMARY OF THE INVENTION

The present invention relates to a method of producing a self aligning concrete pipe to improve the sealing of the joint cooperatively formed between adjacent concrete pipes. The concrete pipe includes a male and female joint member formed on the opposite ends thereof to operatively engage the corresponding joint member formed on the next adjacent concrete pipe to form the joint therebetween.

The male joint member comprises a tongue element including a seal gasket of a predetermined peripheral configuration. The predetermined peripheral configuration of the tongue element comprises an elliptical or oval configuration.

The female joint member includes a groove element extending inwardly from the opposite end of the concrete pipe. The groove element includes an initial alignment stage, intermediate alignment stage and final seat stage.

The initial alignment stage comprises an outer alignment recess. The intermediate alignment stage comprises an intermediate alignment recess. The final seat stage comprises an inner seat recess. The outer alignment recess, intermediate alignment recess and inner seat recess each comprises a configuration corresponding to the predetermined configuration of the tongue element. The corresponding radii of the outer alignment recess, intermediate alignment recess and inner seat recess are decreasing in dimension.

It is not uncommon that when assembling adjacent concrete pipes at the site, the sealing element or gasket engages the next adjacent causing it to snag or to be mutilated. The structure and configuration of the instant invention virtually avoids the inherent problem.

In assembling at the site, adjacent concrete pipes are moved in coaxial relationship relative to each other such that the outer end of the tongue element enters the initial alignment recess causing engagement therebetween to axially, horizontally and vertically align the concrete pipes relative to each other. The tongue element then enters the intermediate alignment recess wherein the predetermined corresponding configurations causing the adjacent concrete pipes to further align axially, horizontally and vertically relative to each other. The tongue element is then seated within the inner seat recess forming the seal joint.

The self aligning concrete pipe as previously described is produced within a mold which comprises a substantially vertical outer female jacket and a substantially vertical inner male core comprising a hollow body properly centered within the outer female jacket. A saddle supports and centers the bottom or second pallet of obverse configuration to the groove element to form the female joint member. The upper or first pallet of obverse configuration to the tongue element to form the male joint member is pressed down upon a concrete mass to form the concrete pipe.

In production, concrete is poured into the space between the inner male core and the outer female jacket and vibrated into place by vibrating mechanisms on both the inner male core and outer female jacket. Specific details of such processes are shown in prior art such as in U.S. Pat. No. 3,584,356.

The invention accordingly comprises the features of construction, combination of elements, and arrangment of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to be the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
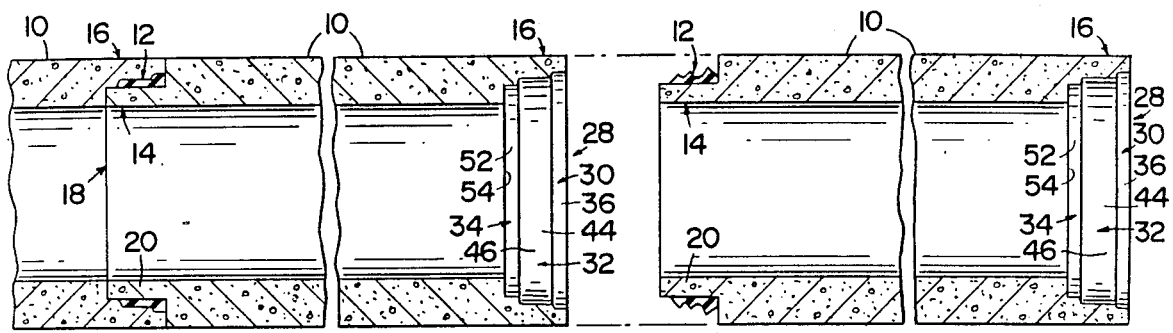
FIG. 1 is a cross-sectional side view of a partial pipe line during assembly.
Figure 9:
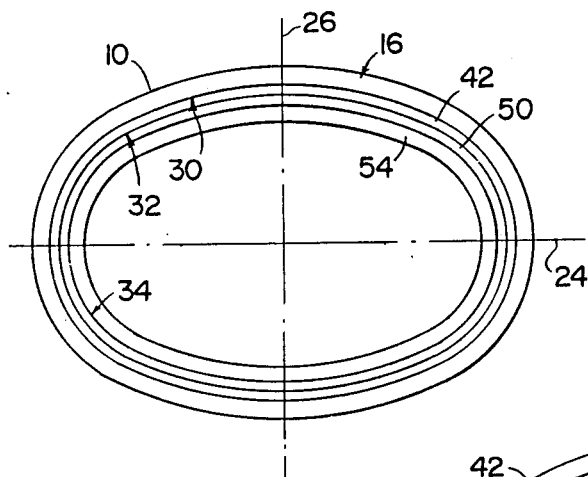
FIG. 9 is an end view of an oval concrete pipe.

The present invention relates to a method of producing a self aligning concrete to improve the sealing of the joint cooperatively formed between adjacent concrete pipes 10. The self aligning concrete pipe 10 is particularly useful in assembling pipe lines of oval concrete pipe 10 as shown in FIG. 1 and 9.

Figure 2:
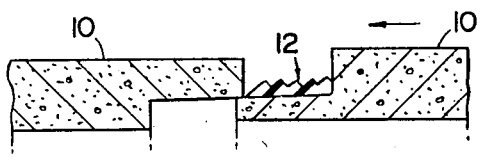
FIG. 2 is a partial cross-sectional side view of adjacent oval concrete pipes using a prior art technique.

The prior art is significantly deficient in several aspects. Specifically as shwon in FIGS. 2 and 3, the sealing element generally indicated as 12 are often dislodged or mutilated during assembly by a portion of the next adjacent concrete pipe 10. In addition, when assembling oval or elliptical concrete pipe 10, adjacent oval or elliptical concrete pipes 10 are not sufficiently axially aligned to permit assembly. Thus there is a clear need for a self aligning concrete pipe 10.

As best shown in FIGS. 4 through 8, the concrete pipe 10 includes a male and female joint member generally indicated as 14 and 16 respectively formed on the opposite ends thereof to operatively engage the corresponding joint member 14/16 formed on the next adjacent concrete pipe 10 to form the joint 18 therebetween.

The male joint member 14 comprises a tongue element 20 of a predetermined peripheral configuration as described more fully hereinafter extending outwardly from the concrete pipe 10. The tongue element 20 further includes the resilient seal 12 of any configuration attached thereto and offset inwardly from the outer end of the tongue element 20 as indicated as A. As best shown in FIG. 9, the predetermined peripheral configuration of the tongue element 20 comprises an elliptical or oval configuration having a greater radius of curvature along the horizontal axis generally indicated as 24 than the radius of curvature along the vertical axis generally indicated as 26. This configuration of concrete pipe 10 is commonly known in the trade as an oval concrete pipe 10.

The female joint member 16 includes a groove element generally indicated as 28 extending inwardly from the opposite end of the concrete pipe 10. The groove element 28 includes an initial alignment stage, intermediate alignment stage and final seat stage generally indicated as 30, 32, and 34 respectively.

The initial alignment stage 30 comprises an outer alignment recess 36 cooperatively formed by an axial alignment camming surface 38 of decreasing diameter and a horizontal and vertical alignment step 40 having an inwardly inclined surface 42. The intermediate alignment stage 32 comprises an intermediate alignment recess 44 cooperatively formed by an axial alignment camming surface 46 of decreasing diameter and a horizontal and vertical alignment step 48 having an inwardly inclined surface 50. The final seat stage 34 comprises an inner seat recess 52 having a decreasing diameter terminating in a base 54. The outer alignment recess 36, intermediate alignment recess 44 and inner seat recess 52 each comprises a configuration corresponding to the predetermined configuration of the tongue element 20. The corresponding radii of the outer alignment recess 36, intermediate alignment recess 44 and inner seat recess 52 are decreasing in dimension. The linear dimension B (depth of axial alignment camming surface 38) is equal to or less than the inward offset A of the resilient seal 12.

Figure 3:
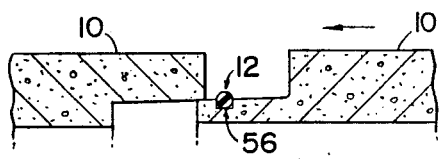
FIG. 3 is a partial cross-sectional side view of adjacent oval concrete pipes using another prior art technique.
Figure 4:
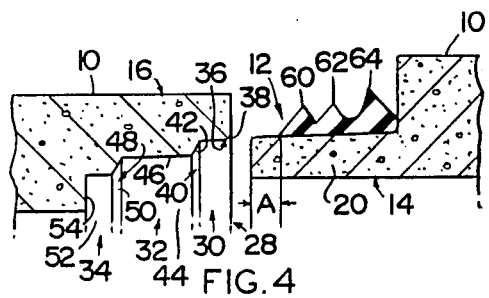
FIG. 4 is a partial cross-sectional side view of adjacent oval concrete pipes prior to the initial stage of assembly.

As shown, the sealing element 12 may comprise any compressible body extending about the outer peripheral surface of the tongue element 20. The sealing element 12 may be formed within the groove element 56 as shown in FIG. 3, to similarly seal the joint 18 between adjacent concrete pipes 10. The sealing element or gasket 12 shown comprises a base 58 having an inner, intermediate and outer enlarged sealing member indicated as 60, 62 and 64 respectively extending outwardly therefrom.

Figure 5:
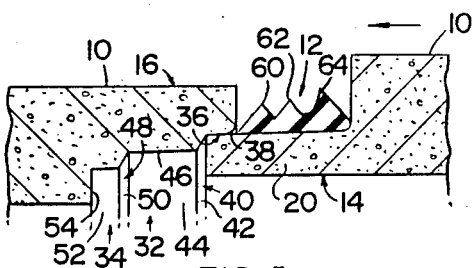
FIG. 5 is a partial cross-sectional side view of adjacent oval concrete pipes during the initial stage of assembly.
Figure 6:
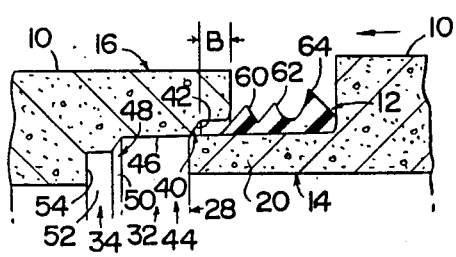
FIG. 6 is a partial cross-sectional side view of adjacent oval concrete pipes during the intermediate stage of assembly.

As previously set forth, it is not uncommon that when assembling adjacent concrete pipes 10 at the site, the sealing element 12 engages the next adjacent pipe 10 causing it to snag or to be mutilated. The structure and configuration of the instant invention virtually avoids this inherent problem. Specifically, since the longitudinally linear dimension of the offset shown as A is equal to or greater than the longitudinal dimension of the outer alignment recess B, the outer end of the tongue element 20 engages the alignment step 42 before the sealing element 12 enters the plane of the female member 16 to protect the sealing element 12 during alignment and assembly of adjacent concrete pipes 10 as best shown in FIG. 5.

Figure 7:
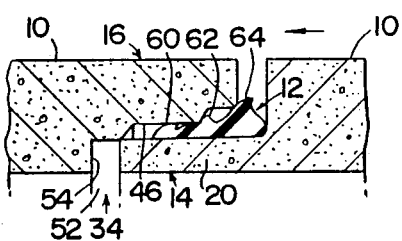
FIG. 7 is a partial cross-sectional side view of adjacent oval concrete pipes during the final stage of assembly.
Figure 8:
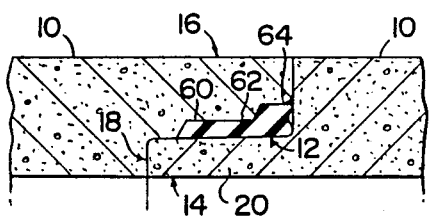
FIG. 8 is a partial cross-sectional side view of adjacent oval concrete pipes forming the joint therebetwee.
Figure 10:
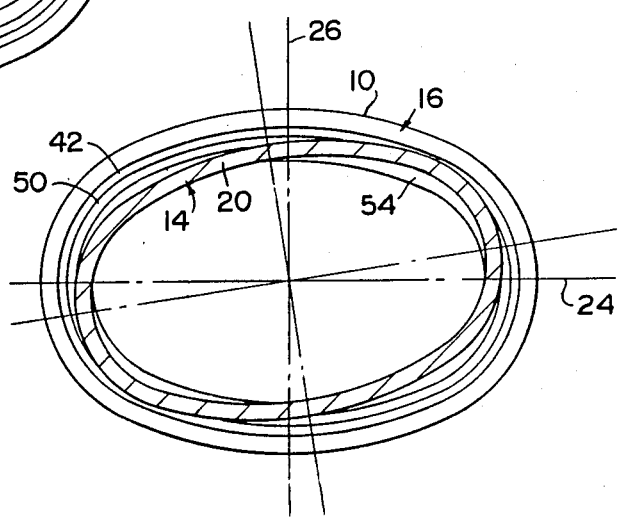
FIG. 10 is a schematic end view of adjacent oval concrete pipes during assembly.

In assembling at the site, adjacent concrete pipes 10 are moved in coaxial relationship relative to each other such that the outer end of the tongue element 20 enters the intial alignment recess 30 causing engagement with axial alignment camming surface 38 to axially align the concrete pipes 10 relative to each other, as shown in FIG. 10. The tongue element 20 then engages the horizontal and vertical alignment step 40 (FIG. 6) to horizontally and vertically align the concrete pipes 10 relative to each other. The tongue element 20 then enters the intermediate alignment recess 44 wherein the predetermined corresponding configurations causing the adjacent concrete pipes 10 to further align axially horizontally and vertically relative to each other (FIG. 7). The tongue element 20 is then seated within the inner seat recess 30 forming the seal joint 12 as best shown in FIG. 8.

The sealing element 12 may be cemented on the tongue element 14 of the concrete pipe 10 at assembly. For joining, a cement type of lubricant with a short set time may be used to insure the sealing.

Figure 11:
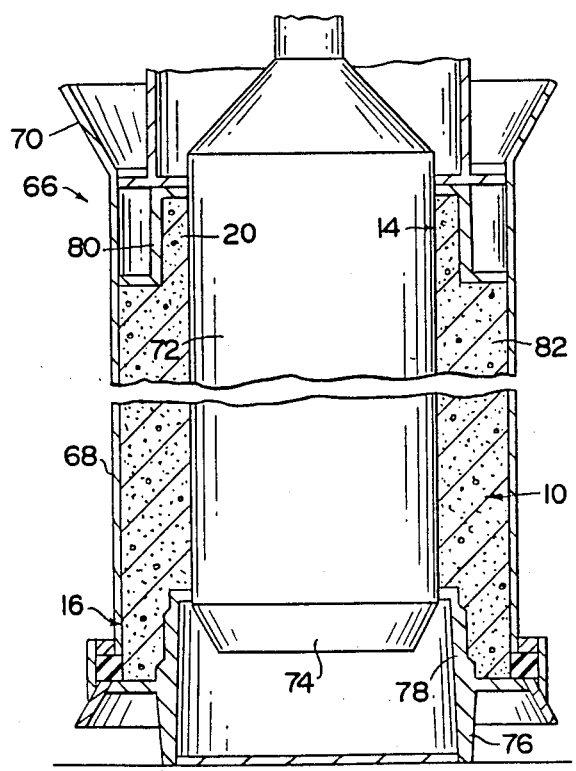
FIG. 11 is a cross-sectional side view of the mold including the outer female jacket and inner male core concentrically disposed therein in combination with the first and second pallets forming the concrete pipe.

The manufacture of the unique structure is best understood with reference to FIG. 11. The self aligning concrete pipe 10 as previously described is produced within a mold 66 which comprises a substantially vertical outer female jacket 68 including a funnel-like portion 70 formed on the upper portion thereof and a substantially vertical inner male core 72 comprising a hollow body having a truncated cone bottom 74 properly centered within the outer female jacket 68. A saddle 76 supports and centers the bottom or second pallet 78 of obverse configuration to the groove element 28 to form the female joint member 16. The upper or first pallet 80 of obverse configuration to the tongue element 20 to form male joint member 14 is pressed down upon a concrete mass 82 to form the concrete pipe 10. Disposed between the outer female jacket 68 and the inner male core 72 may be a reinforcing wire cage (not shown).

In production, the concrete 82 is poured into the space between the inner male core 72 and the outer female jacket 68 and vibrated into place by vibrating mechanisms (not shown) on both the inner male core 72 and outer female jacket 68. Specific details of such processes are shown in prior art such as in U.S. Pat. No. 3,584,356.

Thus through the combination of these unique structural elements, applicant has invented a self aligning concrete pipe and method for producing such concrete pipe particularly useful in assembling oval concrete pipe lines capable of aligning in both the horizontal and vertical directions as well as axially, moreover the specific configuration protects sealing gaskets during assembly.

It will thus be seen that the object set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

What is claimed is:

1. A method of producing a self aligning concrete pipe to improve the seal of the joint cooperatively formed between adjacent concrete pipes wherein each concrete pipe includes a male and female joint member formed on opposite ends thereof to operatively engage the corresponding joint member formed on the next adjacent concrete pipe, said method comprises of using a first pallet and a second pallet to produce said male and female joint members respectively, said first pallet configured to produce said male joint member including a tongue element of a predetermined peripheral configuration extending outwardly from the concrete pipe, said second pallet configured to produce said female joint member including a groove element inwardly from the end of the concrete pipe having the male joint member comprising an initial alignment stage including an outer alignment recess including a horizontal alignment step and a vertical alignment step having an inwardly inclined surface and a final alignment stage including an inner seat recess of a predetermined radial configuration corresponding to said predetermined peripheral configuration of said tongue element such that as adjacent concrete pipes are assembled the outer end of said tongue element enters said outer alignment recess to horizontally and vertically align adjacent concrete pipes by engaging said horizontal and vertical alignment step permitting said tongue element to enter said inner seat recess to form the joint therebetween.

2. The method of claim 1 wherein said outer alignment recess further includes an axial alignment camming surface of decreasing diameter disposed outwardly relative to said horizontal and vertical alignment step of said outer alignment recess such that said tongue element engages said axial alignment camming surface of said outer alignment recess to axially align adjacent concrete pipes.

3. The method of claim 2 wherein said inner seat recess comprises a decreasing diameter terminating in a base to receive the outer portion of said tongue element to minimize deflection between adjacent concrete pipes.

4. The method of claim 2 further including an intermediate alignment stage formed between said initial alignment stage and final seat recess stage comprising a horizontal and vertical alignment step having an inwardly inclined surface to further horizontally and vertically align adjacent concrete pipes during assembly.

5. The method of claim 4 wherein said intermediate alignment recess further includes an axial alignment camming surface of decreasing diameter disposed outwardly relative to said horizontal and vertical alignment step of said intermediate alignment recess such that said tongue element engages said axial alignment camming surface of said intermediate alignment recess to further axially align adjacent concrete pipes.

6. The method of claim 5 wherein said predetermined peripheral configuration of said tongue element comprises a substantially elliptical shape and wherein said predetermined radial configuration of said intermediate alignment recess comprises an elliptical shape.

7. The method of claim 6 wherein cross-sectional diameter of said outer alignment recess is greater than the cross-sectional diameter of said intermediate alignment recess.

8. The method of claim 7 wherein the cross-sectional diameter of said intermediate alignment recess is greater than the cross-sectional diameter of said inner seat recess.

9. A method of producing a self aligning concrete pipe to improve the seal of the joint cooperatively formed between adjacent concrete pipes wherein each concrete pipe includes a male and female joint member formed on opposite ends thereof to operatively engage the corresponding joint member formed on the next adjacent concrete pipe to form the joint therebetween, said method comprising using a first pallet and a second pallet to produce said male and female joint members respectively, said first pallet configured to produce said male joint member including a tongue element of a predetermined peripheral configuration extending outwardly from the concrete pipe, said second pallet configured to produce said female joint member including a groove element extending inwardly from the end of the concrete pipe having the male joint member, said groove element including an outer alignment recess, an intermediate alignment recess and an inner seat recess of a predetermined radial configuration corresponding to said predetermined peripheral configuration of said tongue element such that as adjacent concrete pipes are assembled the outer end of said tongue element enters said outer alignment and intermediate alignment recesses to horizontally, vertically and axially align the adajacent concrete pipes to seat said tongue element within said inner seat recess.

* * * * *